(12) United States Patent
Watanabe et al.

(10) Patent No.: US 12,425,722 B2
(45) Date of Patent: Sep. 23, 2025

(54) SYSTEM FOR PHOTOGRAPHY MANAGEMENT AND METHOD FOR PHOTOGRAPHY MANAGEMENT

(71) Applicant: YAZAKI CORPORATION, Tokyo (JP)

(72) Inventors: Takeyoshi Watanabe, Susono (JP); Aya Hashimoto, Susono (JP); Koichiro Ono, Susono (JP); Shinichi Okamoto, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 79 days.

(21) Appl. No.: 18/626,270

(22) Filed: Apr. 3, 2024

(65) Prior Publication Data
US 2024/0364998 A1     Oct. 31, 2024

(30) Foreign Application Priority Data
Apr. 26, 2023   (JP) .................. 2023-072688

(51) Int. Cl.
*H04N 23/60*    (2023.01)
*H04N 23/74*    (2023.01)

(52) U.S. Cl.
CPC ............. *H04N 23/64* (2023.01); *H04N 23/74* (2023.01)

(58) Field of Classification Search
CPC .............................. H04N 23/64; H04N 23/74
See application file for complete search history.

(56) References Cited

U.S. PATENT DOCUMENTS

| 9,571,713 | B2 * | 2/2017 | Basson | H04N 23/661 |
| 12,384,405 | B2 * | 8/2025 | Tamura | G01C 21/3602 |
| 2013/0201354 | A1 * | 8/2013 | LaScolea | H04N 23/80 |
| | | | | 348/207.1 |

FOREIGN PATENT DOCUMENTS

JP    2019-16100 A    1/2019

* cited by examiner

*Primary Examiner* — Antoinette T Spinks
(74) *Attorney, Agent, or Firm* — KENEALY VAIDYA LLP (57) ABSTRACT

There are provided a system and a method for photography management. The system includes a communication control unit capable of controlling cooperation between a first communication terminal and a second communication terminal. The communication control unit includes functions of: acquiring a taken photo including unique pattern information given in advance to a specific vehicle from a camera of the second communication terminal; identifying whether there is a match between the taken photo and the specific vehicle based on the taken photo and information acquired from the first communication terminal; and giving an instruction to the second communication terminal, the instruction being given by at least one of a display indicating that a vehicle in the taken photo is the specific vehicle on which a person having a desire of being photographed occupies and a voice output indicating that the vehicle is the specific vehicle.

6 Claims, 9 Drawing Sheets

SYSTEM FOR PHOTOGRAPHY MANAGEMENT AND METHOD FOR PHOTOGRAPHY MANAGEMENT

CROSS-REFERENCE TO RELATED APPLICATIONS

This application is based on and claims priority under 35 USC 119 from Japanese Patent Application No. 2023-072688 filed on Apr. 26, 2023, the contents of which are incorporated herein by reference.

TECHNICAL FIELD

The present disclosure relates to a system for photography management and a method for photography management that can be used when a photographer outside a vehicle takes a photo or the like of a user who mainly uses the vehicle.

BACKGROUND ART

For example, JP2019-016100A discloses a technique for implementing a service for mediating between a person who wants to take a photo (person having a desire of being photographed) and a person who takes the photo (photographer). In addition, as described in paragraph 0033 of JP2019-016100A, a server 1 can extract a photographer 5 present in a vicinity of each person having a desire of being photographed 2 using logged user positional information and photographer positional information, transmit information on the photographer 5 to a user device 3 as surrounding photographer information, and the user device 3 can display information of the photographer 5 present in the vicinity. Further, the person having a desire of being photographed 2 can know whether there is a possibility that a photo is taken at this place.

For example, it is considered that people such as tourists who visit various tourist sites in a trip often want to create a diary including photos at the tourist site where the tourists appear in order to leave a reminiscence of the trip. In addition, since traffic is often inconvenient in a tourist site, it is considered that each tourist has many opportunities to borrow a vehicle such as a rental car on site and to travel the tourist site while driving the vehicle by himself or herself.

Accordingly, when each tourist takes a photo of the tourist himself or herself at each place, it is assumed that there are many scenes such as a state in which the tourist himself or herself drives and travels in the vehicle, a state in which the tourist himself or herself gets on and off the vehicle, and a state in which the tourist looks at a vicinity of the rental car borrowed by the tourist himself or herself.

However, for example, in the state in which the tourist himself or herself drives the vehicle, the tourist cannot take a photo of himself or herself.

Here, for example, it is conceivable that a tourist who wants to perform photographing may have photos thereof taken by photographers on site by using a service such as the technique of JP2019-016100A.

However, if it is assumed that a person having a desire of being photographed (tourist) who drives a traveling vehicle or a person having a desire of being photographed near a stopped vehicle is specified by an unknown photographer on site and photographing is performed by a camera, there are the following problems, for example.

(1) When a plurality of vehicles travel in the same direction on the same road in a row, it is difficult for the photographer to distinguish which of the plurality of vehicles is a target vehicle on which the person having a desire of being photographed occupies. (2) When a photographer outside the vehicle photographs a person having a desire of being photographed in the vehicle in a state where the person having a desire of being photographed drives the vehicle, the photographer feels uneasy since the photographer cannot check whether the vehicle as a photographic subject belongs to the person having a desire of being photographed. In addition, since the photographer cannot check whether the person having a desire of being photographed is aware of photographing, he or she may get lost in determining an appropriate photographing timing at which a shutter should be pressed. (3) In a state in which a plurality of vehicles are stopped together with a plurality of persons in a parking lot of a tourist site or the like, a photographer who is present at a distant position and does not know a face of the person having a desire of being photographed cannot easily specify which of the plurality of vehicles is the vehicle of the person having a desire of being photographed and which person is the person having a desire of being photographed. (4) When a photographer outside the vehicle photographs the person having a desire of being photographed in the vehicle in a state in which the person having a desire of being photographed drives the vehicle or in a state in which the person having a desire of being photographed stops, it is difficult to take a clear photo of the person having a desire of being photographed in the vehicle as a photo since a vehicle interior is darker than a vehicle exterior. As a result, quality of the taken photo decreases. (5) In a case in which a photographer outside the vehicle performs photographing in a state in which the person having a desire of being photographed drives the vehicle, when the person having a desire of being photographed does not recognize a position of the photographer, a photographing position, or the like in advance, there is a high possibility that a photo is taken in a state in which a facial direction of the person having a desire of being photographed is not suitable for photograph. As a result, a value of the taken photo decreases. (6) In a case in which a photographer outside the vehicle performs photographing while the person having a desire of being photographed drives the vehicle, the person having a desire of being photographed is likely to look around while driving the vehicle to search for the photographer, and it is difficult to maintain a safer driving state for inattentive driving.

SUMMARY OF INVENTION

The present disclosure provides a system for photography management and a method for photography management useful for facilitating photographing operations of a photographer in a case in which a photographer on site performs photographing with a camera at a position away from a person having a desire of being photographed on a vehicle or a person having a desire of being photographed near the vehicle.

According to an illustrative aspect of the present disclosure, a system for photography management includes a communication control unit capable of controlling cooperation between a first communication terminal used by a specific person having a desire of being photographed who can travel using a vehicle and a second communication terminal used by a photographer who can photograph the specific person by a camera. The communication control unit includes: a taken photo acquisition function of acquiring a taken photo including unique pattern information given in advance to a specific vehicle associated with the specific person from the camera of the second communication terminal; a target recognition function of identifying whether there is a match between the taken photo and the specific vehicle based on the taken photo and information acquired from the first communication terminal; and a photographing object instruction function of giving an instruction to the second communication terminal, the instruction being given by at least one of a display indicating that the vehicle in the taken photo is the specific vehicle on which the specific person occupies and a voice output indicating that the vehicle is the specific vehicle when the match between the taken photo and the specific vehicle is recognized.

According to another illustrative aspect of the present disclosure, a method for photography management includes: ensuring a communication path such that a first communication terminal used by a specific person having a desire of being photographed who can travel using a vehicle and a second communication terminal used by a photographer who can photograph the specific person by a camera can be cooperated; acquiring a taken photo including unique pattern information given in advance to a specific vehicle associated with the specific person from the camera of the second communication terminal; identifying whether there is a match between the taken photo and the specific vehicle based on the taken photo and information acquired from the first communication terminal; and giving an instruction to the second communication terminal, the instruction being given by at least one of a display indicating that the vehicle in the taken photo is the specific vehicle on which the specific person occupies and a voice output indicating that the vehicle is the specific vehicle when the match between the taken photo and the specific vehicle is recognized.

The present disclosure is briefly described above. Further, the details of the present disclosure can be clarified by reading modes (hereinafter, referred to as "embodiments") for carrying out the disclosure described below with reference to the accompanying drawings.

DESCRIPTION OF EMBODIMENTS

A specific embodiment of the present disclosure will be described below with reference to the drawings.

Figure 1:
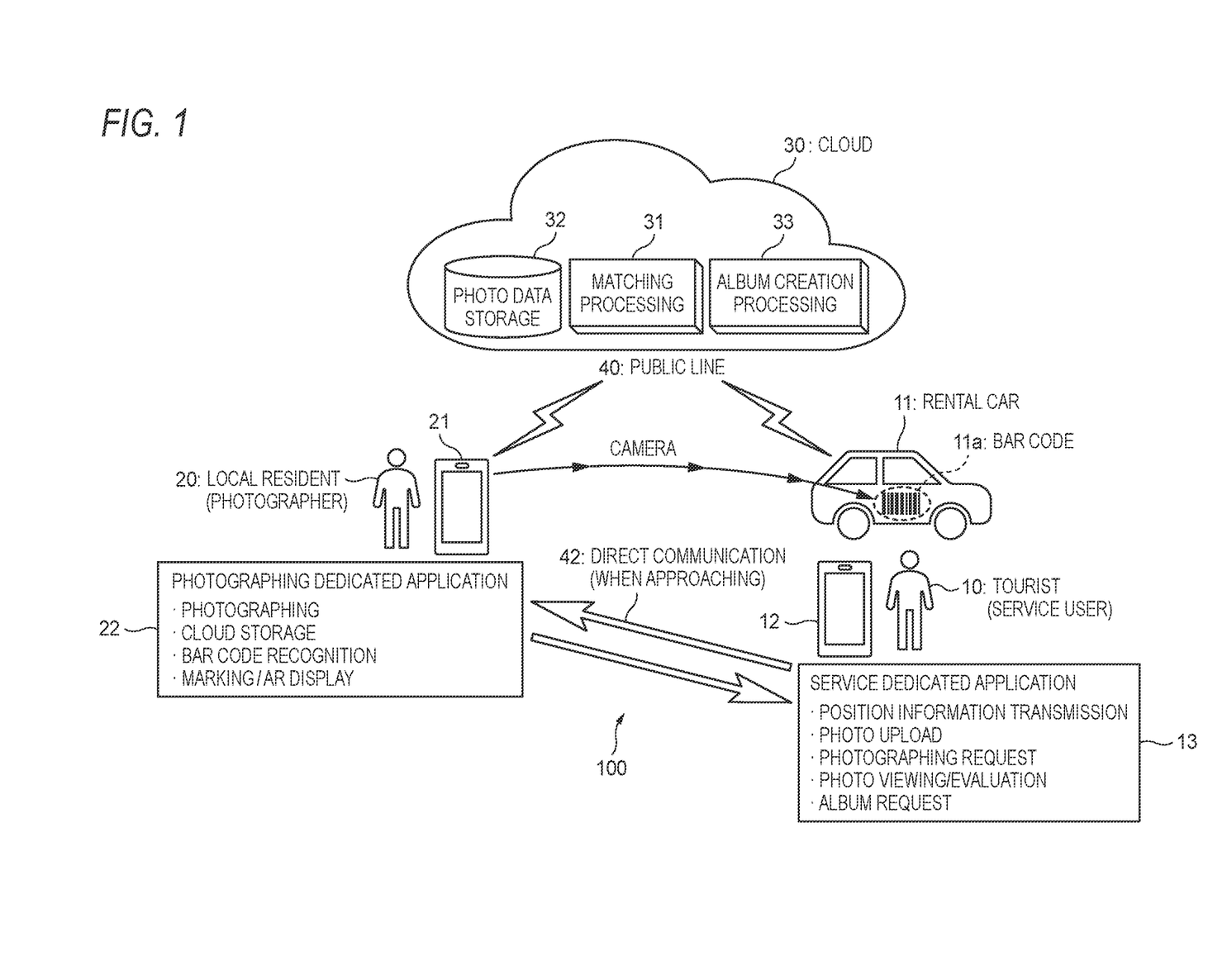
FIG. 1 is a block diagram showing a schematic configuration of a system for photography management according to an embodiment of the present disclosure.

FIG. 1 shows a schematic configuration of a system for photography management 100 according to an embodiment of the present disclosure.

The system for photography management 100 shown in FIG. 1 includes a user terminal 12 used by a service user 10, a photographer terminal 21 used by a photographer 20, and a cloud 30 that provides main functions of a management service.

In the example shown in FIG. 1, the service user 10 is a tourist who goes sightseeing at a tourist site, and uses a user vehicle 11 as a means for traveling various locations of the tourist site. The user vehicle 11 is, for example, a rental car, and a bar code 11a capable of distinguishing each vehicle is added to an outer surface of a vehicle body. Information on the bar code 11a can be optically read using a camera or the like.

In order to distinguish the specific user vehicle 11, a two-dimensional pattern or a unique pattern other than the two-dimensional pattern can also be used instead of the general bar code 11a having a one-dimensional pattern. The photographer 20 is, for example, a normal local resident who lives at various locations of the tourist site, or a professional cameraman who happens to be at the location.

The user terminal 12 is, for example, a smartphone, and is equipped with various communication functions, a camera, a display, various input devices, a global positioning system (GPS) receiver, a control unit (CPU), a storage device, and the like as in a general smartphone.

A service dedicated application 13 for using functions of the cloud 30 is incorporated in the user terminal 12 in advance. The service dedicated application 13 has functions such as positional information transmission, photo upload, photographing requests, photo viewing/evaluation, and album requests.

For example, when the service user 10 travels using the user vehicle 11, the service user 10 can transmit a service request for allowing any photographer 20 to take a photo of the service user 10 to the cloud 30 using the user terminal 12 and the service dedicated application 13.

The photographer terminal 21 used by the photographer 20 is, for example, a smartphone, and is equipped with various communication functions, a camera, a display, various input devices, a GPS receiver, a control unit, a storage device, and the like as in a general smartphone.

In addition, a photographing dedicated application 22 for the photographer 20 to use the functions of the cloud 30 is incorporated in the photographer terminal 21 in advance. The photographing dedicated application 22 has a positional information transmission function, a photo taking function, a cloud storage function of taken photos, a bar code recognition function, a marking/augmented reality (AR) display function, and the like.

On the other hand, the cloud 30 is implemented by, for example, application software (application) incorporated in a server device installed in a predetermined data center. The server device has a function of communicating with the user terminal 12 and the photographer terminal 21 via a public communication line 40. The cloud 30 according to the present embodiment includes a matching processing unit 31, a photo data storage unit 32, and an album creation processing unit 33.

The matching processing unit 31 has a processing function necessary for implementing smooth matching for taking a photo between the service user 10 who wants to take a photo and the photographer 20 at each location registered in advance. The photo data storage unit 32 can store data such as a photo taken by the photographer 20. The album creation processing unit 33 implements processing for creating a photo album.

<Positional Relationship between Service User and Photographer>

Figure 2:
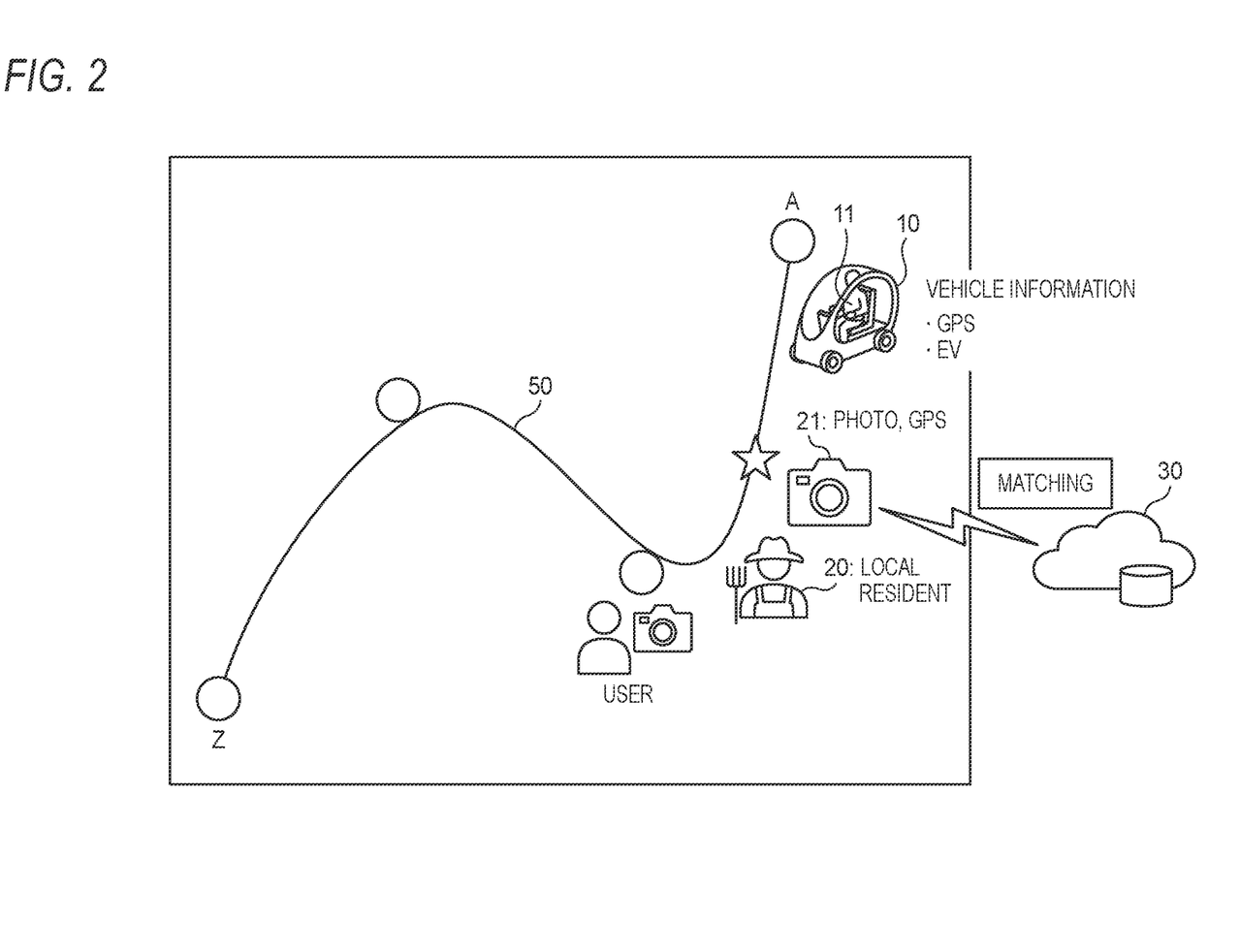
FIG. 2 is a plan view showing an example of a positional relationship between a service user and a photographer.

FIG. 2 shows an example of a positional relationship between the service user 10 and the photographer 20.

The service user 10 uses the user vehicle 11 such as a rental car as shown in FIG. 2, and travels on a road 50 while going sightseeing from a point A to a point Z. At each point on the road 50 on the way of traveling, there is a possibility that the service user 10 may request to take a photo as reminiscence.

In addition, in a tourist site or the like, there is a possibility that a local resident or the like is present in each site as the photographer 20. The photographer terminal 21 held by each photographer 20 has a function of a camera that takes a photo as a smartphone, a function of grasping a current position of the photographer by GPS, a function of communicating with the cloud 30, and the like.

When the service user 10 wants to take a photo, the service user 10 operates the service dedicated application 13 of the user terminal 12, so that a request for photo taking can be transmitted to the cloud 30 together with positional information of the subject vehicle.

Since the current positions of the photographer 20 present at the points are grasped, the matching processing unit 31 of the cloud 30 can match each service user 10 with the specific photographer 20 by using the current position of the user vehicle 11 of the service user 10 transmitted with the request for photo taking, the current position of each photographer 20, information of a road map, and the like.

For example, the matching processing unit 31 of the cloud 30 automatically controls lighting of interior lighting, a headlamp, and the like in the specific user vehicle 11 of the service user 10, so that the photographer 20 can more easily visually check the user vehicle 11 to be photographed.

In addition, as shown in FIG. 1, the photographer 20 can read the bar code 11*a* on the user vehicle 11 by the camera of the photographer terminal 21 and transmit information on the bar code 11*a* from the photographer terminal 21 to the cloud 30.

Since the matching processing unit 31 of the cloud 30 grasps the information on the bar code 11*a* of the user vehicle 11 in advance, by comparing this information with the information on the bar code 11*a* transmitted by the photographer 20, it is possible to identify whether the vehicle as a photographic subject to which the camera of the photographer 20 is faced matches the user vehicle 11 of the service user 10.

Based on the information transmitted from the matching processing unit 31, the photographing dedicated application 22 on the photographer terminal 21 adds marking information to the user vehicle 11 as a photographing object on the display of the photographer terminal 21, and executes an AR display in a state where a video of the user vehicle 11 as the photographic subject and the marking information are superimposed. With this AR display, the photographer 20 can easily photograph the service user 10 without making a mistake on the user vehicle 11 as the photographing object.

Each of the user terminal 12 and the photographer terminal 21 normally accesses the cloud 30 using the public communication line 40 and is in a communication state via the cloud 30. On the other hand, when a distance between the user terminal 12 and the photographer terminal 21 is short, direct communication 42 without relaying in the cloud 30 may be performed.

On the other hand, when the photographer 20 actually photographs the user vehicle 11 and the service user 10 that are in traveling, a more clear photo may not be taken due to various factors. For example, when photographing is performed in a state in which a traveling speed of the user vehicle 11 is too fast, failures in photographing timing, positioning, focusing, light amount adjustment, and the like are likely to occur. Further, in a case in which another preceding vehicle travels in front of the user vehicle 11 as the photographing object, when an inter-vehicle distance between the user vehicle 11 and the preceding vehicle is short, there is a high possibility that the preceding vehicle is simultaneously photographed in a state of blocking the user vehicle 11, and quality of the taken photo deteriorates.

The system for photography management 100 is also equipped with a vehicle control system for implementing an appropriate photography environment by cooperation between the cloud 30 and the user vehicle 11. For example, when the user vehicle 11 approaches a place where the photographing is to be performed, an accelerator operation is limited or an automatic braking operation is implemented, so that the traveling speed of the user vehicle 11 does not become high. Alternatively, a driver of the user vehicle 11 is guided by display, voice, or the like, so that the driver of the user vehicle 11 drives in the above manner. When the inter-vehicle distance between the user vehicle 11 and the preceding vehicle is short, the inter-vehicle distance is controlled to be large.

<Operation of System According to Difference in Situation>

Figure 3:
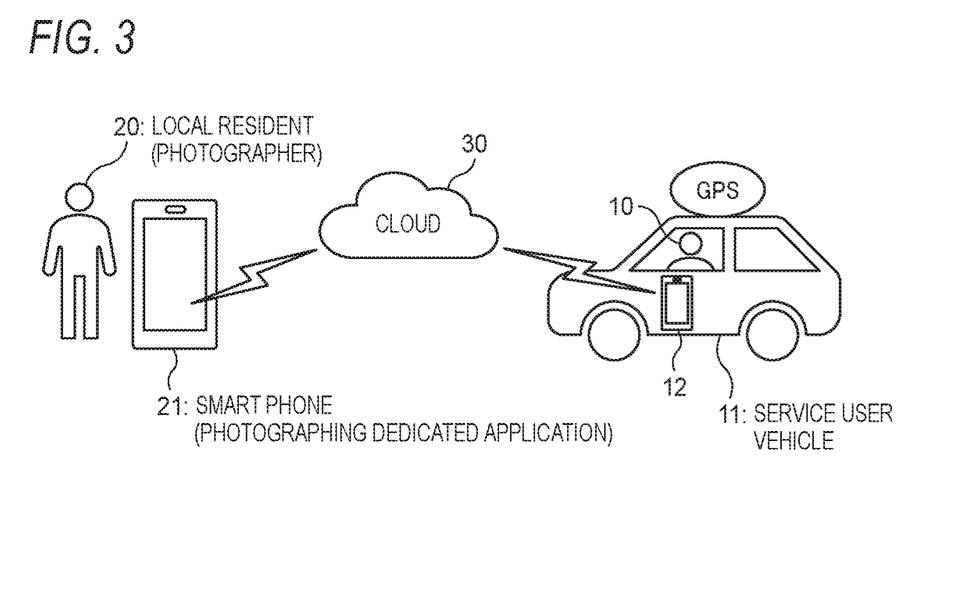
FIG. 3 is a schematic diagram showing an operational state-1 in the system for photography management.
Figure 4:
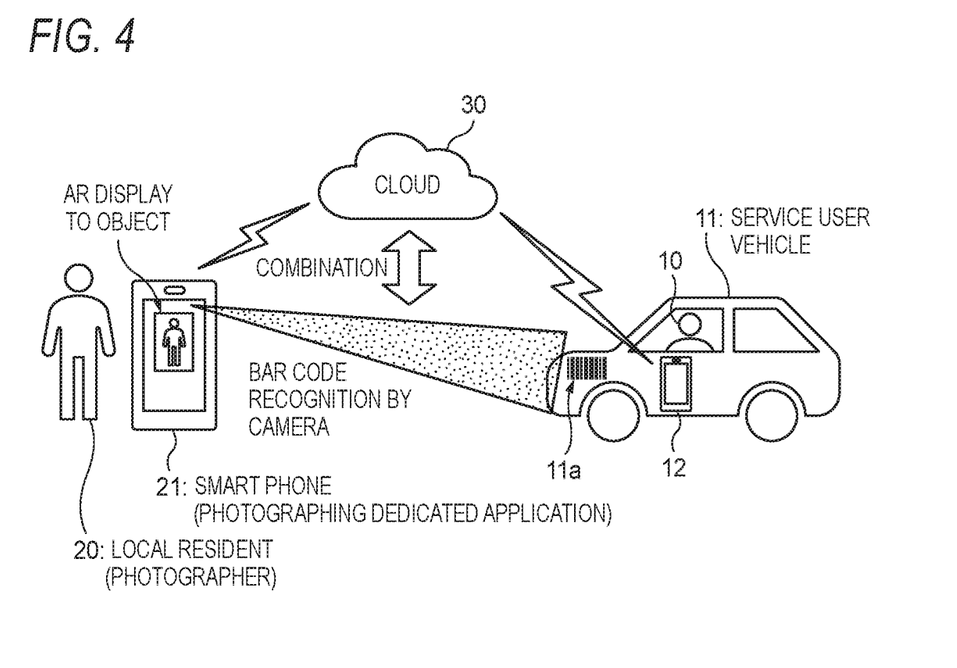
FIG. 4 is a schematic diagram showing an operational state-2 in the system for photography management.
Figure 5:
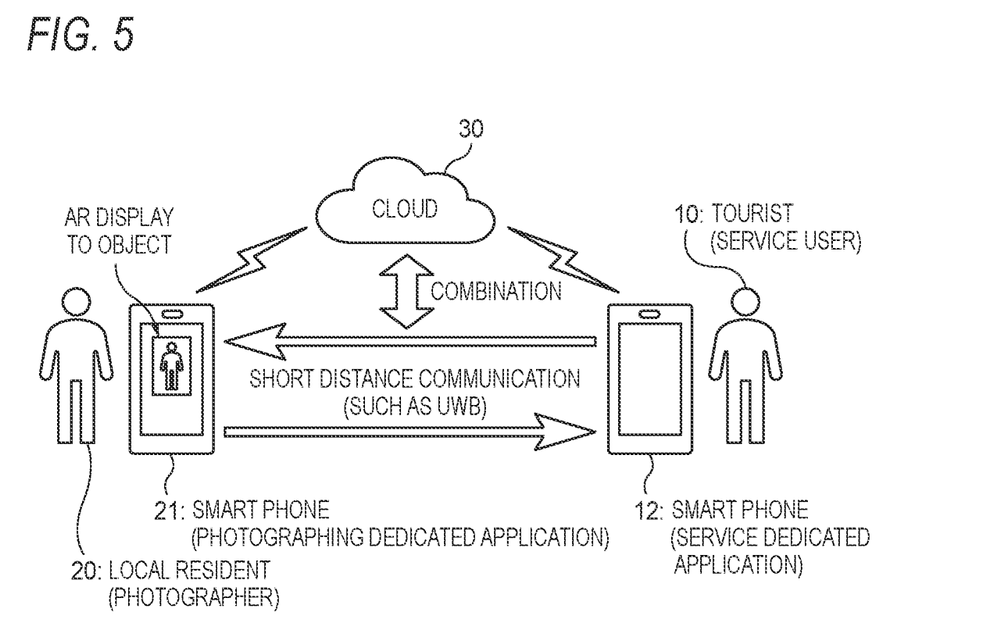
FIG. 5 is a schematic diagram showing an operational state-3 in the system for photography management.

FIGS. 3 to 5 show outlines of respective operation states in three kinds of situations of the system for photography management 100 in FIG. 1.

<When Distance Between User Vehicle 11 and Photographer 20 is Large>

As shown in FIG. 3, the service user 10 on the user vehicle 11 can communicate with the cloud 30 via the user terminal 12 and the public communication line 40, and transmit the request for photo taking to the service of the cloud 30 together with the information on the current position of the user vehicle 11. The current position of the user vehicle 11 is periodically updated by, for example, positioning using GPS, and is periodically transmitted to the cloud 30.

In addition, when the photographer 20 who is present at each site activates the photographing dedicated application 22 on the photographer terminal 21, the positional information of the photographer 20 is transmitted to the cloud 30 using the public communication line 40. The cloud 30 grasps the distance between the service user 10 and the photographer 20 based on the positional information on the service user 10 side and the positional information on the photographer 20 side, and executes matching according to the distance.

<When User Vehicle 11 Approaches Position of Photographer 20>

When the user vehicle 11 approaches the position of the photographer 20, the photographer 20 can visually recognize the user vehicle 11 from the position of the photographer 20, and thus, as shown in FIG. 4, the photographer 20 can photograph the user vehicle 11 with the camera of the photographer terminal 21 and read the bar code 11*a* of the user vehicle 11.

The photographing dedicated application 22 of the photographer terminal 21 transmits the information on the bar code 11*a* read from the user vehicle 11 to the cloud 30 via the public communication line 40.

Since a content of the bar code 11*a* of the user vehicle 11 associated with the service user 10 is grasped in advance, the cloud 30 can identify whether the information on the bar code 11*a* transmitted from the photographer 20 matches the user vehicle 11 of the service user 10.

When the information on the bar code 11*a* matches the user vehicle 11 of the service user 10, the AR display of a target vehicle is executed on the display of the photographer terminal 21 under the control of the cloud 30 and the photographing dedicated application 22. That is, a real-time video of the photographic subject shot by the camera of the photographer terminal 21 and the mark indicating that the user vehicle 11 recognized by the bar code 11*a* is the photographing object vehicle are displayed in a superimposed state. Accordingly, the photographer 20 can easily recognize the user vehicle 11 as the photographing object.

<When Service User 10 Gets Off User Vehicle 11>

When the photographer 20 approaches the service user 10 for a purpose of photographing, short distance wireless communication can be performed between the photographer terminal 21 and the user terminal 12 as shown in FIG. 5. As a specific example of the short distance wireless communication, ultra wide band (UWB), Wi-Fi (registered trademark), or the like can be used.

Therefore, the system for photography management 100 can execute processing of a photographing service by using both the direct communication between the photographer terminal 21 and the user terminal 12 and the communication using the cloud 30. The photographing dedicated application 22 of the photographer terminal 21 executes the AR display of the service user 10 on the display of the photographer terminal 21. For example, a target person mark such as a rectangular frame indicating that a person as a photographing object is the service user 10 who desires to be photographed is displayed in a state of being superimposed on a region surrounding the service user 10 in the video on the real-time video of the photographic subject shot by the camera of the photographer terminal 21.

<Main Function and Communication Path>

Figure 6:
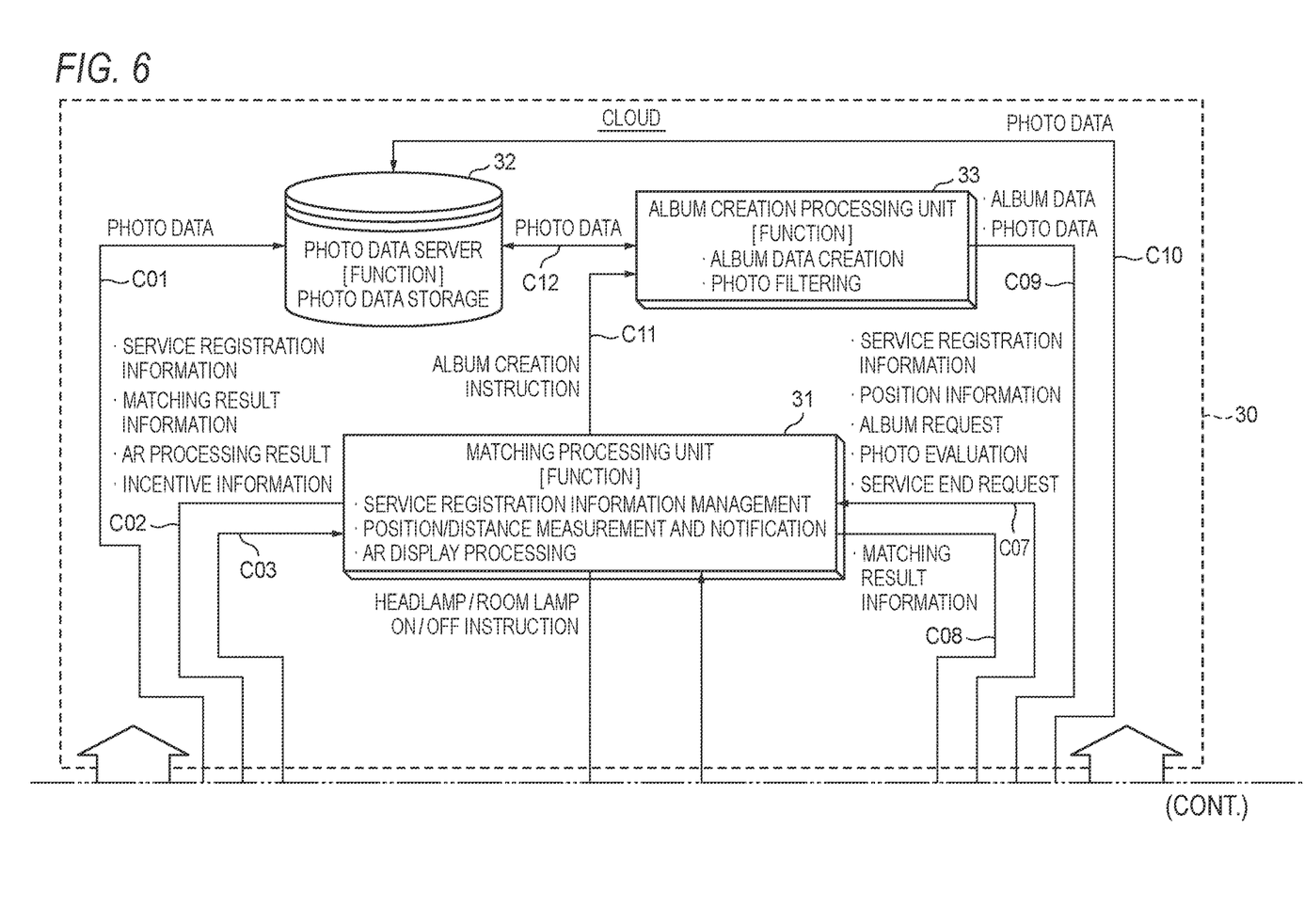
FIG. 6 is a block diagram showing an example of main functions and communication paths in the system for photography management.

An example of main functions and communication paths in the system for photography management 100 is shown in FIG. 6.

As shown in FIG. 6, the photographer 20 and the cloud 30 can be connected to each other through communication paths C01, C02, and C03. That is, the photographer terminal 21 or the photographing dedicated application 22 can transmit the positional information of the photographer 20, the camera video of the photographer terminal 21, various types of request information, and the like to the matching processing unit 31 of the cloud 30 through the path C03. In addition, the photographer terminal 21 or the photographing dedicated application 22 can transmit data of the photo taken by the photographer 20 using the camera of the photographer 20 to the photo data storage unit 32 of the cloud 30 through the communication path C01.

The matching processing unit 31 of the cloud 30 can transmit service registration information, matching result information, an AR processing result, incentive information, and the like to the photographer terminal 21 or the photographing dedicated application 22.

When the distance between the photographer 20 and the service user 10 is short, a mail message, various requests, and guidance information can be mutually transmitted and received between the photographing dedicated application 22 and the service dedicated application 13 through the communication path C04 using the direct communication 42. The photographing dedicated application 22 can read the bar code 11*a* of the user vehicle 11 used by the service user 10 from a camera video CP shot by the camera of the photographer terminal 21.

In addition, the user terminal 12 of the service user 10 and the cloud 30, the service dedicated application 13 and the cloud 30, and the user vehicle 11 and the cloud 30 can be connected to each other through each of communication paths C05 to C10 using the public communication line 40.

The matching processing unit 31 of the cloud 30 can transmit an on-off instruction of the headlamp and a room lamp to the user vehicle 11 through the communication path C05. The user vehicle 11 can transmit the vehicle information, the information on the current position of the vehicle, travel history information, and the like to the matching processing unit 31 through the communication path C06. The communication between the user vehicle 11 and the cloud 30 may be relayed by the user terminal 12 and the service dedicated application 13.

The user terminal 12 or the service dedicated application 13 can transmit the service registration information, the positional information, an album request, photo evaluation, a service end request, and the like to the matching processing unit 31 of the cloud 30 through the communication path C07.

Further, the matching processing unit 31 can transmit a matching processing result to the user terminal 12 or the service dedicated application 13 through the communication path C08. The album creation processing unit 33 of the cloud 30 can provide album data and photo data on the cloud 30 to the service dedicated application 13 through the communication path C09. Further, the service dedicated application 13 can transmit the photo data taken by the user terminal 12 to the photo data storage unit 32 of the cloud 30 through the communication path C10.

In addition, the matching processing unit 31 of the cloud 30 can transmit an album creation instruction to the album creation processing unit 33 through the communication path C11 in accordance with the album request from the service dedicated application 13. The album creation processing unit 33 can create an album of photos held by the photo data storage unit 32 in accordance with the album creation instruction from the matching processing unit 31. The created album can be stored in the photo data storage unit 32.

<Processing Procedure of System for Photography Management>

Figure 7:
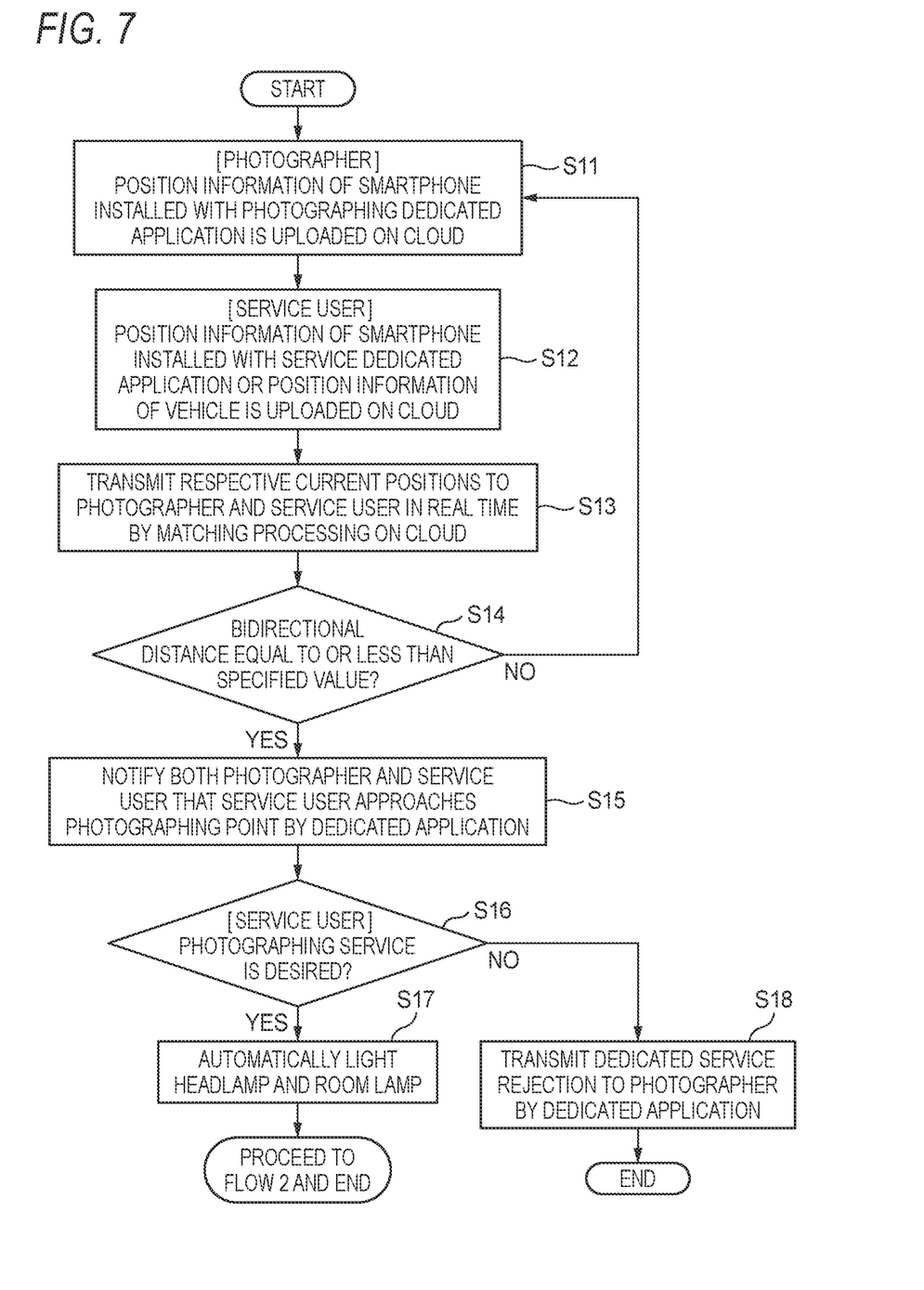
FIG. 7 is a flowchart showing a processing procedure of the system for photography management in a first state.
Figure 8:
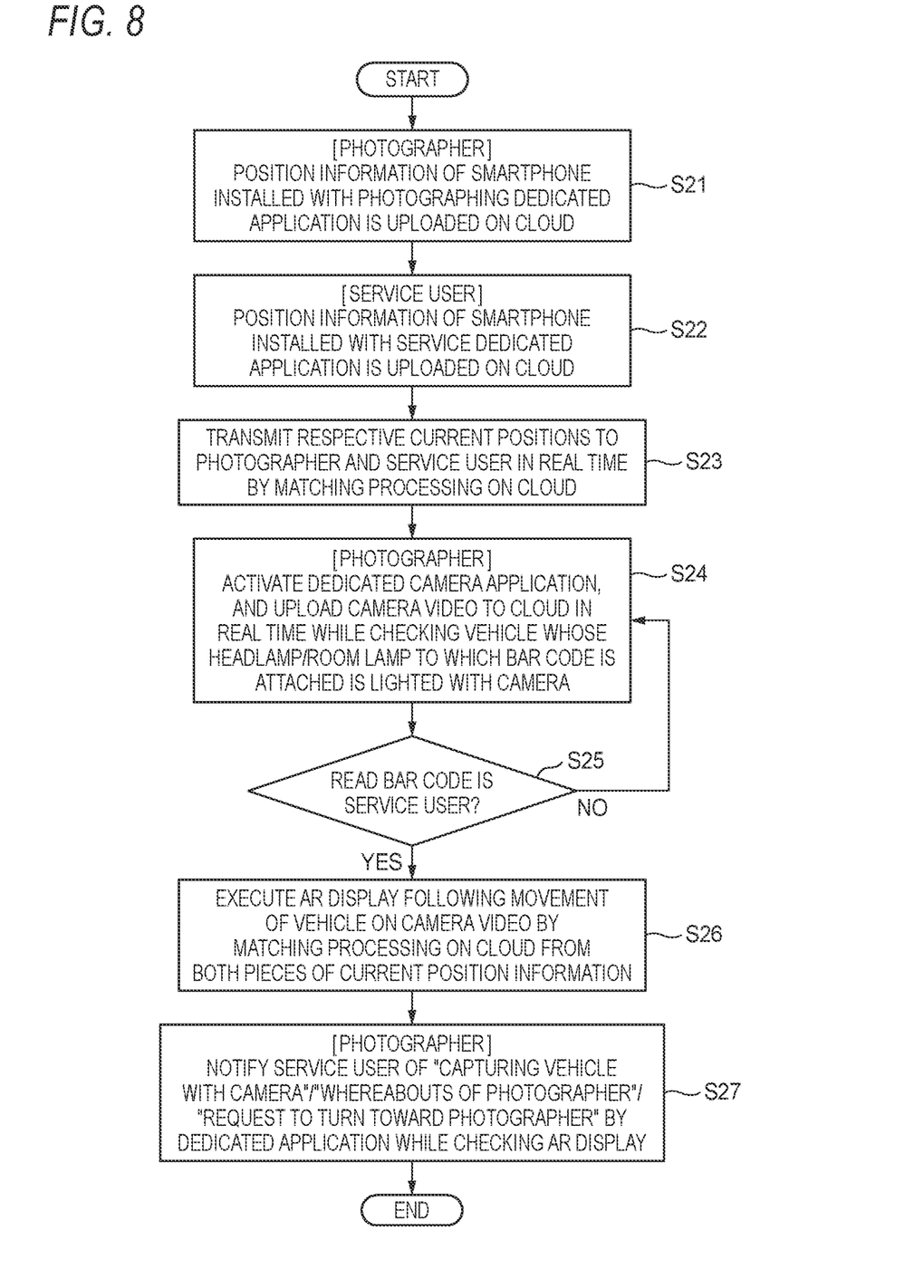
FIG. 8 is a flowchart showing a processing procedure of the system for photography management in a second state.
Figure 9:
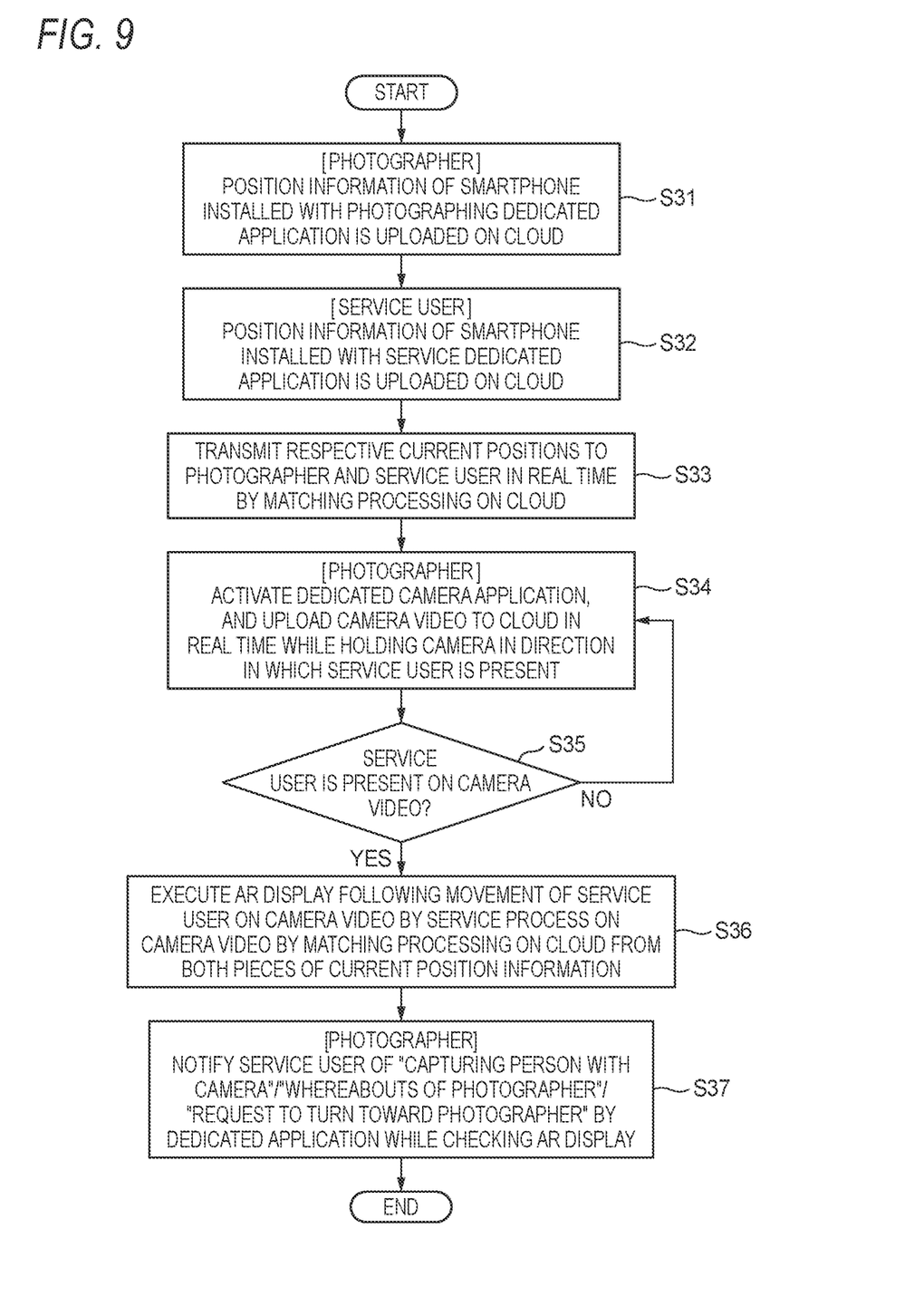
FIG. 9 is a flowchart showing a processing procedure of the system for photography management in a third state.

Examples of the processing procedure of the system for photography management 100 in three types of states are shown in FIGS. 7 to 9, respectively. The processing procedure shown in FIGS. 7 to 9 will be described below.

<When Distance between User Vehicle 11 and Photographer 20 is Large>

As shown in FIG. 7, the photographing dedicated application 22 on the photographer terminal 21 of the photographer 20 periodically transmits, for example, the information on the current position of the photographer terminal 21 to the cloud 30 (S11).

The service dedicated application 13 on the user terminal 12 held by the service user 10 periodically transmits, for example, the information on the current position of the user terminal 12 or the information on the current position of the user vehicle 11 to the cloud 30 (S12).

The matching processing unit 31 of the cloud 30 notifies the photographer terminal 21 of the photographer 20 of the current position of the service user 10 in real time, and notifies the user terminal 12 of the service user 10 of the current position of the photographer in real time (S13).

The matching processing unit 31, the service dedicated application 13, or the photographing dedicated application 22 grasps the distance between the position of the service user 10 and the position of the photographer 20, and compares the distance with a specified value (for example, 500 m) in S14. When the distance is equal to or less than the specified value, the processing proceeds to S15, and when the distance exceeds the specified value, the processing returns to S11.

The system for photography management 100 notifies both the service user 10 and the photographer 20 that the user vehicle 11 of the service user 10 approaches a photographing point (S15). This processing is executed by at least one of the matching processing unit 31, the service dedicated application 13, and the photographing dedicated application 22.

In S16, the matching processing unit 31 identifies whether there is a photographing service request from the service dedicated application 13 of the service user 10. When the service user 10 requests the photographing service, the processing proceeds from S16 to S17, and when the service user 10 does not request the photographing service, the processing proceeds to S18.

In S17, the matching processing unit 31 or the service dedicated application 13 gives an instruction to an illumination system of the user vehicle 11 to automatically light both the headlamp and the room lamp of the user vehicle 11. By illumination of the headlamp of the user vehicle 11, the photographer 20 can visually and easily recognize the user vehicle 11 on which the service user 10 to be photographed occupies. In addition, by lighting the room lamp, it becomes easy to take a clear photo in a bright state in the vehicle.

The matching processing unit 31 or the photographing dedicated application 22 notifies the photographer 20 of a photographing service rejection of the service user 10 (S18).

<When User Vehicle 11 Approaches Photographer 20>

As shown in FIG. 8, the photographing dedicated application 22 on the photographer terminal 21 of the photographer 20 periodically transmits, for example, the information on the current position of the photographer terminal 21 to the cloud 30 (S21).

The service dedicated application 13 on the user terminal 12 held by the service user 10 periodically transmits, for example, the information on the current position of the user terminal 12 or the information on the current position of the user vehicle 11 to the cloud 30 (S22).

The matching processing unit 31 of the cloud 30 notifies the photographer terminal 21 of the photographer 20 of the current position of the service user 10 in real time, and notifies the user terminal 12 of the service user 10 of the current position of the photographer in real time (S23).

The photographing dedicated application 22 is activated on the photographer terminal 21 of the photographer 20 (S24). Here, the photographer 20 operates the photographing dedicated application 22 to cause the camera of the photographer terminal 21 to face to the user vehicle 11 to which the bar code 11a is attached and to which the headlamp and the room lamp are lit. A real-time video shot by the camera is displayed on the display of the photographer terminal 21. The photographing dedicated application 22 transmits the shot video including the bar code 11a to the cloud 30 in real time.

The matching processing unit 31 of the cloud 30 recognizes the bar code 11a in the real-time video received from the photographing dedicated application 22 of the photographer 20, and compares a recognition result of the bar code with the information of the bar code of the user vehicle 11 used by the service user 10 (S25). When the recognition result and the information of the bar code match, the processing proceeds from S25 to S26, and when the recognition result and the information of the bar code do not match, the processing of S24 is repeated.

The matching processing unit 31 of the cloud 30 performs processing such that the position of the user vehicle 11 matching the information of the bar code and the position of the photographer 20 are matched, and notifies the photographing dedicated application 22 and the service dedicated application 13 of the respective pieces of positional information in real time (S26). Based on the positional information transmitted from the matching processing unit 31, the photographing dedicated application 22 specifies a region of the user vehicle 11 as the photographing object in an image frame shot by the camera of the photographer terminal 21, and executes the AR display so as to follow a movement of the user vehicle 11 in the image frame in real time. For example, a mark such as a rectangular pattern is displayed in a state of being superimposed on a position surrounding the user vehicle 11 in the image frame of the video of the user vehicle 11 (see FIG. 4).

The photographing dedicated application 22 on the photographer terminal 21 of the photographer 20 notifies the service dedicated application 13 of the service user 10 of necessary information using the public communication line 40 or the direct communication 42 (S27). A content of the information to be notified is configured such that the service user 10 can understand "the photographer 20 captures the user vehicle 11 with the camera while checking the AR display", "where the photographer 20 is (i.e., whereabouts of the photographer 20)", and "the photographer 20 requests the service user 10 to faces toward the photographer 20".

Therefore, the photographer 20 can execute photo taking while more easily grasping, by the AR display on the display screen of the photographer terminal 21, that the photographing object to which the camera of the photographer 20 faces is the user vehicle 11 on which the target service user 10 occupies. Since the room lamp of the user vehicle 11 as the photographing object is lit, the photographer 20 can take a clear photo in a state where an interior of a vehicle compartment of the user vehicle 11 is bright.

In addition, before the photographer 20 takes a photo, the service user 10 schedules photo taking from the photographer 20, and the service user 10 is notified of the whereabouts of the photographer 20, and thus, the service user 10 can perform an action suitable for photo taking. (S27). For example, it is possible to implement, at an appropriate timing, reducing the traveling speed of the user vehicle 11 in order to ensure safety or directing a facial direction or sight of the service user 10 toward the camera of the photographer 20.

<When Distance Between Service User 10 and Photographer 20 is Reduced after Service User 10 Gets Off Vehicle>

As shown in FIG. 9, the photographing dedicated application 22 on the photographer terminal 21 of the photographer 20 periodically transmits, for example, the information on the current position of the photographer terminal 21 to the cloud 30 (S31).

The service dedicated application 13 on the user terminal 12 held by the service user 10 periodically transmits, for example, the information on the current position of the user terminal 12 to the cloud 30 (S32).

The matching processing unit 31 of the cloud 30 notifies the photographer terminal 21 of the photographer 20 of the current position of the service user 10 in real time, and notifies the user terminal 12 of the service user 10 of the current position of the photographer in real time (S33).

The photographing dedicated application 22 is activated on the photographer terminal 21 of the photographer 20 (S34). Here, since the photographer 20 grasps the positional relationship between the current position of the service user 10 and the position of the photographer 20 based on the information notified from the cloud 30, the photographer 20 can operate the photographing dedicated application 22 to cause the camera of the photographer terminal 21 to face to the target service user 10.

Therefore, a real-time video including the service user 10 shot by the camera is displayed on the display of the photographer terminal 21. The photographing dedicated application 22 transmits the shot video to the cloud 30 in real time (S34).

The matching processing unit 31 of the cloud 30 analyzes the real-time video received from the photographing dedicated application 22 of the photographer 20 and recognizes a person. Further, based on the current position of the service user 10 received from the service dedicated application 13, the position of the photographer 20 received from the photographing dedicated application 22, the direction of the camera, and the like, a comparison is performed on whether the person in the real-time video matches the service user 10 as the photographing object (S35).

When the person in the real-time video matches the service user 10 as the photographing object, the processing proceeds from S35 to S36, and when the person in the real-time video does not match the service user 10 as the photographing object, the processing of S34 is repeated.

The matching processing unit 31 of the cloud 30 associates the person matching the service user 10 as the photographing object with the position of the person in the real-time video so as to be matched to each other, and notifies the photographing dedicated application 22 of the positional information in real time (S36).

Based on the positional information transmitted from the matching processing unit 31, the photographing dedicated application 22 specifies the region of the service user 10 as the photographing object in an image frame shot by the camera of the photographer terminal 21, and executes the AR display so as to follow a movement of the service user 10 in the image frame in real time. For example, a mark such as a rectangular pattern is displayed in a state of being superimposed on a position surrounding the service user 10 in the image frame of the video of the service user 10 (see FIG. 5).

The photographing dedicated application 22 on the photographer terminal 21 of the photographer 20 notifies the service dedicated application 13 of the service user 10 of necessary information using the public communication line 40 or the direct communication 42 (S37). A content of the information to be notified is configured such that the service user 10 can understand "the photographer 20 captures the service user 10 by the camera while checking the AR display", "where the photographer 20 is (i.e., the whereabouts of the photographer 20)", and "the photographer 20 requests the service user 10 to face toward the photographer 20".

The present disclosure is not limited to the embodiments described above and can be appropriately modified, improved and the like. In addition, materials, shapes, sizes, numbers, arrangement positions and the like of components in the embodiments described above are freely selected and are not limited as long as the present disclosure can be implemented.

For example, in the above-described system for photography management 100, the photographer 20 uses the bar code 11a attached to the surface of the vehicle body of the user vehicle 11 in order to recognize the target user vehicle 11, but a unique pattern other than the bar code optically readable by the camera may be used instead of the bar code 11a. In addition, for example, a function of recognizing a difference in a vehicle body shape or a vehicle type of the user vehicle 11 from an external appearance in the video shot by the camera may be used together with reading of the bar code 11a.

In the above-described system for photography management 100, the real-time video of the photographic subject shot by the camera of the photographer terminal 21 and the mark indicating that the user vehicle 11 recognized by the bar code 11a is the photographing object vehicle are displayed in the superimposed state, but the photographer terminal 21 may be notified of a number, color, vehicle type, and positions of "vehicle in front" and "vehicle on the right side" of the user vehicle 11 or the like by characters and voices. Alternatively, the photographer terminal 21 may be notified that the superimposed vehicle matches the user vehicle 11 as the photographing object by using characters such as "correct answer", symbols such as "o" and "x", voice or chime indicating a correct answer or an incorrect answer.

As described above, according to the system for photography management 100 of the present embodiment, since the photographer 20 can specify the user vehicle 11 as the photographing object based on the bar code 11a or the like, the photographer 20 can easily execute photographing without making a mistake on the photographing object even when a plurality of vehicles travel side by side on the road. In particular, the display of the mark or the like indicating the user vehicle 11 as the photographing object is subjected to the AR display together with the video of the photographic subject on the display screen of the photographer terminal 21, and the photographer terminal 21 is caused to output a voice indicating the user vehicle 11 as the photographing object, and thus, even when another vehicle appears near the user vehicle 11 or the photographer 20 changes the direction of the camera, it is possible to prevent the photographer 20 from losing sight of the user vehicle 11 as the photographing object.

In addition, since the user vehicle 11 as the photographing object lights the headlamp or the room lamp before approaching the photographer 20 (S17), the photographer can easily distinguish the user vehicle 11 as the photographing object from other vehicles even in a state where the distance is relatively long. Since the room lamp of the user vehicle 11 as the photographing object is lit, the photographer 20 can photograph the service user 10 in the state where the interior of the vehicle compartment is bright. Accordingly, improvement in quality of a photo to be taken can be expected.

In addition, since the system for photography management 100 notifies the service user 10 of necessary information before the photographer 20 executes photographing (S27), the service user 10 can take an action suitable for photo taking while traveling. For example, the service user 10 can accurately grasp the relative position of the photographer 20 with respect to the position of the service user 10 and direct the facial direction or sight toward the camera. In addition, the service user 10 can grasp a timing of photographing to reduce the traveling speed of the user vehicle 11 or take an action necessary for ensuring safety.

Here, the features of the system for photography management and the method for photography management according to the embodiment of the present disclosure described above are briefly summarized and listed in the following aspects 1 to 6.

According to an aspect 1, a system for photography management (100) includes a communication control unit (cloud 30) capable of controlling cooperation between a first communication terminal (user terminal 12) used by a specific person having a desire of being photographed (service user 10) who can travel using a vehicle (user vehicle 11) and a second communication terminal (photographer terminal 21) used by a photographer (20) who can photograph the person having a desire of being photographed (service user 10) by a camera. The communication control unit includes; a taken photo acquisition function (S24) of acquiring, from a camera on the second communication terminal side, a taken photo including unique pattern information (bar code 11a) given in advance to a specific vehicle associated with the person having a desire of being photographed; a target recognition function (S25) of identifying whether there is a match between the taken photo and the specific vehicle based on the taken photo and the information acquired from the first communication terminal; and a photographing object instruction function (S26) of instructing, to the second communication terminal, at least one of a display indicating that the vehicle in the taken photo is the specific vehicle on which the person having a desire of being photographed occupies and an output of a voice indicating that the vehicle is the specific vehicle when the match between the taken photo and the specific vehicle is recognized.

According to the system for photography management having the configuration of the aspect 1, it is possible to reliably specify the vehicle to be photographed by the photographer by recognizing the unique pattern information. Further, since the mark indicating the specific vehicle as the photographing object is displayed on the screen of the photographer side or is notified by the voice, the photographer can easily identify the specific vehicle to be photographed even when a plurality of vehicles simultaneously travel on the same road.

According to an aspect 2, in the system for photography management according to the aspect 1, the photographing object instruction function instructs the second communication terminal to perform a superimposed display of a display indicating the specific vehicle on a screen.

According to the system for photography management having the configuration of the above aspect 2, since the mark indicating the specific vehicle as the photographing object is superimposed and displayed together with a video of the photographic subject on the screen of the photographer side, the photographer can easily identify the specific vehicle to be photographed even when a plurality of vehicles simultaneously travel on the same road.

According to an aspect 3, in the system for photography management according to the aspect 1, the communication control unit includes a photographing illumination control unit (S17) configured to transmit a lighting instruction to perform illumination on the specific vehicle to the first communication terminal after receiving information indicating that the photographer checks the photographing object.

According to the system for photography management having the configuration of the above aspect 3, since the illumination on the specific vehicle as the photographing object is automatically performed at least at the time of photographing, the photographer can normally execute photographing in a state where the interior of the vehicle compartment is bright. Accordingly, a photographing object in the interior of the vehicle compartment can be taken to obtain a clear photo.

According to an aspect 4, in the system for photography management according to the aspect 1, the communication control unit includes a photographing preparation notification unit (S27) configured to transmit, to the first communication terminal, a notification indicating that the camera of the photographer captures the person having a desire of being photographed after receiving information indicating that the photographer checks the photographing object.

According to the system for photography management having the configuration of the above aspect 4, it becomes easy for the person having a desire of being photographed to take an action suitable for photo taking before photographing. For example, the person having a desire of being photographed can accurately grasp the relative position of the photographer with respect to the position of the person having a desire of being photographed and direct the facial direction or sight toward the camera. In addition, the person having a desire of being photographed can grasp a timing of photographing to reduce the traveling speed of the subject vehicle or take an action necessary for ensuring safety.

According to an aspect 5, in the system for photography management according to [1], the communication control unit includes a notification illumination control unit (S17) configured to control illumination on the specific vehicle and notify the photographer that the specific vehicle is the vehicle as the photographing object when it is detected that the specific vehicle enters a region in which the specific vehicle can be photographed based on the positional information of the specific vehicle and the positional information of the camera on the second communication terminal side.

According to the system for photography management having the configuration of the above aspect 5, even when the vehicle as the photographing object is at a position relatively distant from the position of the photographer, the photographer can easily distinguish the corresponding vehicle and the other vehicle depending on the difference in illumination.

According to an aspect 6, a method for photography management includes: ensuring a communication path (public communication line 40, direct communication 42) such that a first communication terminal (user terminal 12) used by a specific person having a desire of being photographed (service user 10) who can travel using a vehicle (user vehicle 11) and a second communication terminal (photographer terminal 21) used by a photographer (20) who can photograph the person having a desire of being photographed (service user 10) by a camera can be cooperated; acquiring (S24), from a camera on the second communication terminal side, a taken photo including unique pattern information (bar code 11a) given in advance to a specific vehicle associated with the person having a desire of being photographed; identifying (S25) whether there is a match between the taken photo and the specific vehicle based on the taken photo and the information acquired from the first communication terminal; and instructing (S26), to the second communication terminal, at least one of a display indicating that the vehicle in the taken photo is the specific vehicle on which the person having a desire of being photographed occupies and an output of a voice indicating that the vehicle is the specific vehicle when the match between the taken photo and the specific vehicle is recognized.

According to the method for photography management having the procedure of the aspect 6, it is possible to reliably specify the vehicle to be photographed by the photographer by recognizing the unique pattern information. Further, since the mark indicating the specific vehicle as the photographing object is superimposed and displayed on the video of the photographic subject on the screen of the photographer side or is notified by the voice, the photographer can easily identify the specific vehicle to be photographed even when a plurality of vehicles simultaneously travel on the same road.

According to the system for photography management and the method for photography management of the present disclosure, when a photographer on site performs photographing with a camera at a position away from the person having a desire of being photographed in the vehicle or the person having a desire of being photographed near the vehicle, the photographer can easily perform the photographing operations.

What is claimed is:

1. A system for photography management comprising:
  a communication control unit capable of controlling cooperation between a first communication terminal used by a specific person having a desire of being photographed who can travel using a vehicle and a second communication terminal used by a photographer who can photograph the specific person by a camera, wherein the communication control unit includes:
    a taken photo acquisition function of acquiring a taken photo including unique pattern information given in advance to a specific vehicle associated with the specific person from the camera of the second communication terminal;
    a target recognition function of identifying whether there is a match between the taken photo and the specific vehicle based on the taken photo and information acquired from the first communication terminal; and
    a photographing object instruction function of giving an instruction to the second communication terminal, the instruction being given by at least one of a display indicating that the vehicle in the taken photo is the specific vehicle on which the specific person occupies and a voice output indicating that the vehicle is the specific vehicle when the match between the taken photo and the specific vehicle is recognized.

2. The system for photography management according to claim 1, wherein
  the photographing object instruction function instructs the second communication terminal so that the display indicating the specific vehicle is superimposed on a screen.

3. The system for photography management according to claim 1, wherein
  the communication control unit includes a photographing illumination control unit configured to transmit a lighting instruction to perform illumination on the specific vehicle to the first communication terminal after receiving information indicating that the photographer checks the photographing object.

4. The system for photography management according to claim 1, wherein
  the communication control unit includes a photographing preparation notification unit configured to transmit a notification indicating that the camera of the photographer captures the specific person to the first communication terminal after receiving information indicating that the photographer checks the photographing object.

5. The system for photography management according to claim 1, wherein
  the communication control unit includes a notification illumination control unit configured to control illumination on the specific vehicle and notify the photographer that the vehicle is the specific vehicle of the photographing object, when detecting that the specific vehicle enters a region in which the specific vehicle can be photographed based on positional information of the specific vehicle and positional information of the camera on the second communication terminal.

6. A method for photography management comprising:
  ensuring a communication path such that a first communication terminal used by a specific person having a desire of being photographed who can travel using a vehicle and a second communication terminal used by a photographer who can photograph the specific person by a camera can be cooperated;
  acquiring a taken photo including unique pattern information given in advance to a specific vehicle associated with the specific person from the camera of the second communication terminal;
  identifying whether there is a match between the taken photo and the specific vehicle based on the taken photo and information acquired from the first communication terminal; and
  giving an instruction to the second communication terminal, the instruction being given by at least one of a display indicating that the vehicle in the taken photo is the specific vehicle on which the specific person occupies and a voice output indicating that the vehicle is the specific vehicle when the match between the taken photo and the specific vehicle is recognized.

* * * * *